United States Patent [19]

Jennings et al.

[11] Patent Number: 4,708,376
[45] Date of Patent: Nov. 24, 1987

[54] HYDRAULIC COLLET-TYPE CONNECTOR

[75] Inventors: Charles E. Jennings, Agoura; Edward E. Thames, Ventura, both of Calif.

[73] Assignee: Vetco Gray Inc., Houston, Tex.

[21] Appl. No.: 32,940

[22] Filed: Mar. 27, 1987

Related U.S. Application Data

[63] Continuation of Ser. No. 824,402, Jan. 31, 1986, abandoned.

[51] Int. Cl.$^4$ ............................................. F16L 37/18
[52] U.S. Cl. ..................................... 285/315; 285/320; 285/18; 285/920
[58] Field of Search ................... 285/315, 320, 920, 18

[56] References Cited

U.S. PATENT DOCUMENTS

| 3,492,027 | 1/1970 | Herring | 285/320 X |
| 4,433,859 | 2/1984 | Driver et al. | 285/920 X |
| 4,496,172 | 1/1985 | Walker | 285/315 X |
| 4,557,508 | 12/1985 | Walker | 285/315 X |

OTHER PUBLICATIONS

Christmas Tree Production–p. 1665 of Composite Catalog.
10,000 and 15,000 PSI WP Collet Connectors–p. 1642 of Composite Catalog.
McEvoy's "MD" Wellhead Connector: 18¾ 10000 PSI and 15000 PSI–p. 5137 of Composite Catalog.

Primary Examiner—Richard J. Scanlan, Jr.
Attorney, Agent, or Firm—Joseph R. Dwyer

[57] ABSTRACT

The collet-type connector (10) comprising an upper body member (20) having a plurality of collet segments (52), a cam ring (64) movable relative to the upper body member (20) to move said collet segments (52) into a detachable connection of the connector to a subsea wellhead (14, 14a). The cam ring (64) and collet segments (52) have sets of camming surfaces whereby a first set (86, 92) cooperate to pivot the collet segments (52) initially toward the wellhead (14, 14a) and whereby a second set (96, 104) serves to urge the collet segments (52) further to clamp the connector (10) to the subsea wellhead (14, 14a). When the second set (96, 104) of camming surfaces function, the first set (86, 92) no longer function to rotate the collet segments, thus reducing the power requirement for urging the collet segments (52) into clamping engagement to only one set at a time, even though both sets together serve to aid in holding the collet segments in clamping engagement with the wellhead after final engagement.

The connector is further characterized by the fact that, first, one set (86, 92) of camming surfaces serves to hold the collet segments (52) in a conical orientation to facilitate positioning the connector (10) over the wellhead (14, 14a) and, second, together with the complementary ledges (92, 94) to form a load path (arrow 122) between the collet segments (52) and the upper body member so that any load on the connector (10) as it is being placed in the wellhead (14, 14a) will be transferred to the upper body member. Further, the means for actuating the cam ring (64) are hydraulic cylinders (66) which are mounted for easy removal and replacement, if necessary.

9 Claims, 4 Drawing Figures

4,708,376

HYDRAULIC COLLET-TYPE CONNECTOR

This is a continuation of application Ser. No. 824,402 filed Jan. 31, 1986, now abandoned.

BACKGROUND OF THE INVENTION

This invention relates to collet-type connectors used to detachably connect a subsea well unit, such as a production tree, to a subsea wellhead, previously positioned at the bottom of a body of water.

It is an object of this invention is to provide a collet-type connector with camming surfaces on a cam ring and cooperating camming surfaces on the collet segments whereby a first set of camming surfaces urge the collet segments inwardly toward the wellhead into an initial position where the inward camming action ceases and whereby a second set of camming surfaces urge the collet segments further inwardly into clamping engagement with a wellhead thus reducing the power required to activate the sets of camming surfaces to one set at a time.

Another object of this invention to provide a collet-type connector which minimizes the distance between the top of a wellhead and the subsea unit. For example, present collet-type connectors are between 4 to 5 feet in height whereas the connector constructed in accordance with the teachings of this invention is about 28 inches in height.

Still another object of this invention is to provide a collet-type connector wherein the travel of the actuating means (cam ring) for urging the collet segments into clamping engagement with the wellhead is less than in prior art collet-type connectors, thus aiding in the minimizing of the distance between the wellhead and subsea unit, aforesaid.

SUMMARY OF THE INVENTION

The collet-type connector which accomplishes the foregoing objects comprises an upper body member having a plurality of collet segments arranged to pivot thereon, a cam ring movable relative to the upper body member to move said collet segments into a detachable connection of the connector to a subsea wellhead. The cam ring and collet segments have sets of camming surfaces whereby a first set cooperate to pivot the collet segments initially toward the wellhead and whereby a second set serves to urge the collet segments further to clamp the connector to the subsea wellhead. When the second set of camming surfaces function, the first set no longer function to rotate the collet segments, thus reducing the power requirement for urging the collet segments into clamping engagement to only one set at a time, even though both sets together serve to aid in holding the collet segments in clamping engagement with the wellhead after final engagement.

The connector is further characterized by the fact that, first, one of the sets of camming surfaces and complementary ledges serve to hold the collet segments in a conical orientation to facilitate positioning the connector over the wellhead and, second, to form a load path between the ends of the collet segments and the upper body member so that any load on the connector as it is being placed onto the wellhead will be transferred to the upper body member. Further, the means for actuating the cam ring are hydraulic cylinders which are mounted for easy removal and replacement, if necessary.

DETAILED DESCRIPTION

Figure 1:
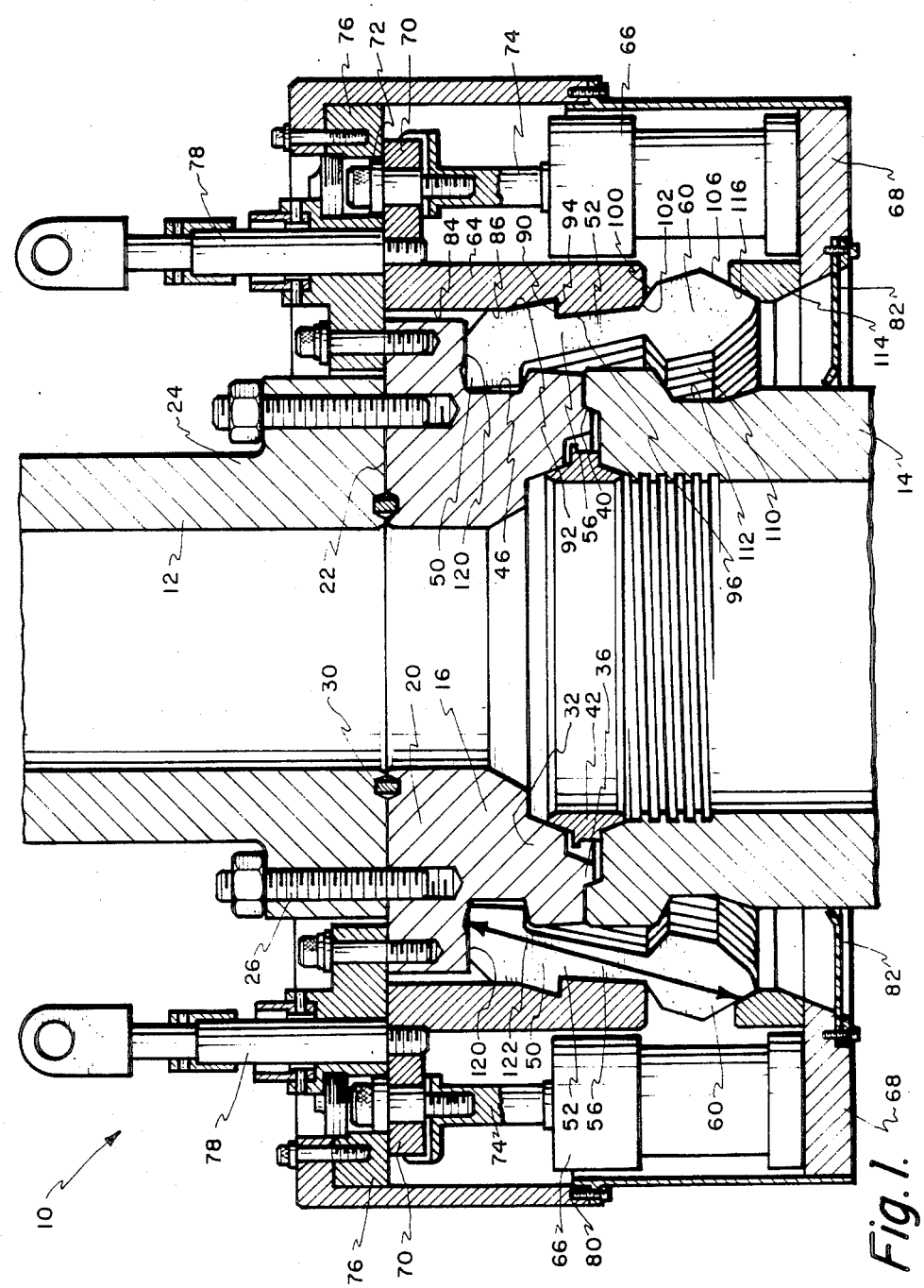
FIG. 1 is a cross-sectional view in elevation showing the collet-type connector of this invention connected to a flanged tubular member of a subsea well unit and positioned on a wellhead and with the collet segments in unlocked position.

As shown in the drawings, and as explained above, the purpose of this invention is to detachably latch a subsea well unit, such as a production tree, to a subsea wellhead previously positioned at the bottom of a body of water. Thus, a collet-type tree connector 10 of this invention is shown located between a flanged tubular member 12 of a production tree (not shown) and connected to a subsea wellhead 14. All three units are centrally bored for access between the tree and the subsea well.

The collet-type tree connector 10 comprises an upper body member, or ring, 16 having an upper part 20 whose upper surface 22 is directly connected to a flange 24 of the tubular member 12 by bolts 26. A suitable metallic seal 30 seals the flange 24 and upper body member 16 against leakage.

The lower part 32 of the upper body member 16 is of a lesser outer diameter than the upper part 20 and is provided with a seal preparation which includes a downwardly extending rim 36 to engage a conical surface 40 on the top of the wellhead 14. In the embodiment shown, a metallic seal ring 42 is positioned between the upper body member 16 and the top of the wellhead which provides an appropriate seal between the ring and the wellhead. A retainer (not shown) holds the seal in the tree connector 10 as the latter is lowered onto the wellhead.

The outer periphery of the upper body where the upper and lower parts 20,32 join is provided with a peripheral retaining groove 46 to contain the upper retaining portion or head 50 of a plurality of collet segments 52 which are used to latch the upper body member 16 to the wellhead 14 in a manner to be described.

These collet segments 52 are positioned completely around the upper body member 16 and are formed conventionally from a solid ring by sawing the solid ring axially to form individual segments. The method of forming such segments in this manner is conventional and need not be further described. As shown, though, each segment 52 has the previously mentioned large or thicker upper head 50, a narrow neck 56 and a thicker larger lower portion 60. The function of the head 50 and the lower portion 60 will be described later.

Radially outwardly of, and encompassing part of, the collet segments 52 and the upper body member 16 is a cam ring 64 which is movable axially relative to the upper body member 16 and collet segments 52 and engages the latter. The cam ring is activated by a plurality of hydraulic cylinders 66, only two being shown in FIG. 1. These cylinders are each positioned on an apertured plate 68 located at the bottom of the connector 10 where the aperture of the plate may act as an entrance opening for the connector 10 as it is being positioned on the wellhead 14. The cam ring 64 also has a horizontal flange 70 which is attached by set screws to the piston rod 74 of the hydraulic cylinder 66. When the cam ring 64 is in unlocked position, as shown in FIG. 1, the horizontal flange 70 engages a ring flange 76 which is bolted to the top surface 22 of the upper body member 16. The ring flange 76 acts as an upper stop for the piston rod 74 and is apertured to slideably receive a backup release and position indicator rod 78 which, first, indicates when the wellhead connector 10 is locked and unlocked by virtue of its position relative to the top of the ring 76 and, secondly, may be used to unlatch the wellhead connector 10 in the event of a hydraulic failure by virtue of being connected to the cam ring 64. A cover 80 and rubber seal ring 82 are removably attached by bolts to the ring flange 76 and plate 68 to reduce the entry of debris and the like from entering the connector. The plate 68 is connected to the ring flange plate 76 by a plurality of long bolts (not shown). Also, as shown, the cylinders 66 may easily be removed and replaced by detachment from the horizontal arm 70 of the cam ring by removal of set screws 72.

The side of the cam ring 64 facing the collet segments 52 has an upper cylindrical surface 84 which has a tapered notch forming a first tapered cam surface 86 and an upwardly facing ledge 90 to respectively engage a complementary tapered surface 92 and a complementary downwardly facing ledge 94 on the collet segments 52.

The portion of the cam ring 64 below the ledge 90 forms still another cam surface 96 which, when in unlocked position as shown in FIG. 1, seats in and engages the large notch formed by the neck 56 of the collet segments 52.

The lower end portion 60 of each of the collet segments 52 has a first tapered shoulder 100 which engages the end 102 of the cam ring 64, a tapered driving shoulder 104, and a radially inwardly tapered shoulder, 106. The inner side of each of the latch segments 52 is provided with a profile 110 which is complementary to a profile 112 on the wellhead 14 which, in the embodiment shown, is simply an external groove on the outside wall of the wellhead spaced below the mouth of the wellhead. The lower end portion 60 and the length of the neck 56 of each collet segment 52 is determined by the distance between the groove profile 112 on the wellhead 14 and the external retainer groove 46 on the upper body member 16.

Finally, the connector 10 is provided with a bumper ring 114 attached to the apertured plate 68 and against which the collet segments 52 rest when in unlocked position. This bumper ring 114 is provided with an inwardly facing tapered shoulder 116 to engage the shoulder 106 on the latch segments and defines a load path between the bumper ring 114, the latch segments 52, and the upper wall 120 of the retainer groove 46 on the upper body member 16, as indicated in the drawing by an arrow 122. It is apparent also that the plurality of collet segments 52 engaging the bumper ring 114 form a rigid entry cone for the tree connector as it is positioned on the wellhead 14. The complimentary ledges 90 and 94 aid in the rigidity of the cone when the collet segments are in locked position.

Figures 2, 3:
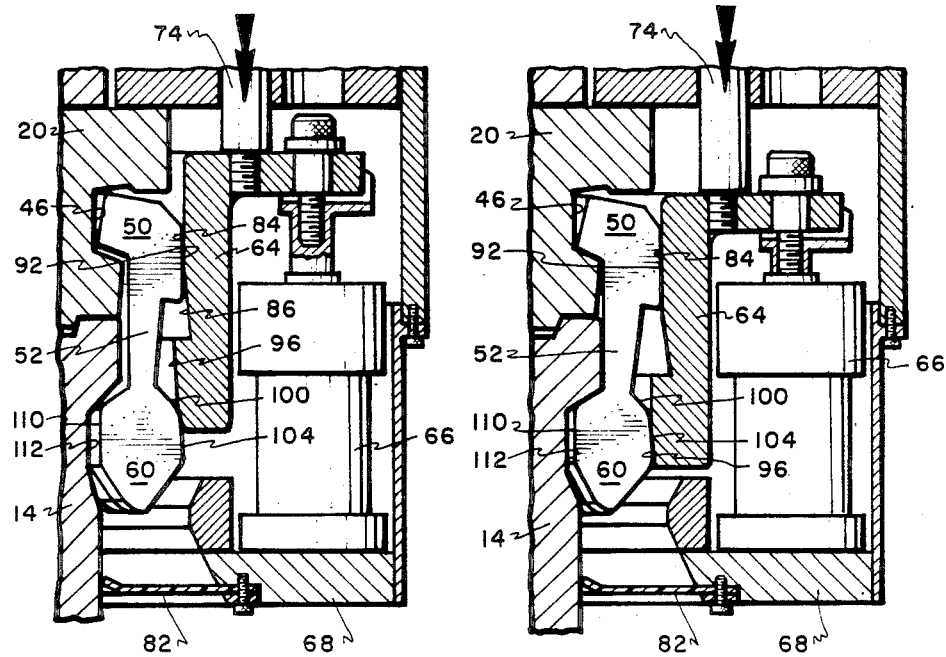
FIG. 2 is a partial view of FIG. 1 showing the collet segments midway between locked and unlocked position.
FIG. 3 is a partial view of FIG. 1, similar to FIG. 2, showing the collet segments in locked position.

Now taking FIGS. 1, 2 and 3 together, which are illustrations of the movement of the collet segments from their unlocked position, FIG. 1, to the locked position, FIG. 3. In the unlocked position of the collet segments 52, the head 50 is positioned in the retaining groove 46, and the cam ring 64 serves to hold the heads 50 within the groove 46. The heads 50 are free to pivot within the groove 46, however, as the cam ring 64 moves downward. Groove 46 together with the head 50, also serves to latch the upper body member to the wellhead 14 in the locked position of the collet segments. It can be seen that upon initial downward movement of the cam ring 64, the combined action of cam surfaces 86 and 92, as a first set of camming surfaces, urge the collet segments radially inwardly, freeing the lower portion 60 from engagement with end 102 of the cam ring 64. Thereafter, the camming surface 96 engages the camming surface 104 on the latch segments, as a second set of camming surfaces, to force the collet segments into the wellhead groove 112. It is to be noted that, during this latter travel, the only surfaces being functional to urge the collet segments inwardly are the second set of camming surfaces since camming surfaces 92 on the collet segments are engaging the vertical surface 84 on the cam ring thus reducing the power requirements for the hydraulic cylinders.

Thus, final downward movement of the cam ring 64 urges the collet segments into clamping engagement with the wellhead 14, thus locking the tree to the wellhead. In this position, the cam ring engages the collet segments in two places, surfaces 92 and 104, maintaining the connection between the connector and the wellhead in two places, grooves 46 and 112.

It should be apparent, also that with the overlapping relationship between the cam ring 64 and the collet segments 52, the stroke of the cam ring 64 is noticeably shorter than prior art connectors, thus shortening the height of the connector considerably.

Figure 4:
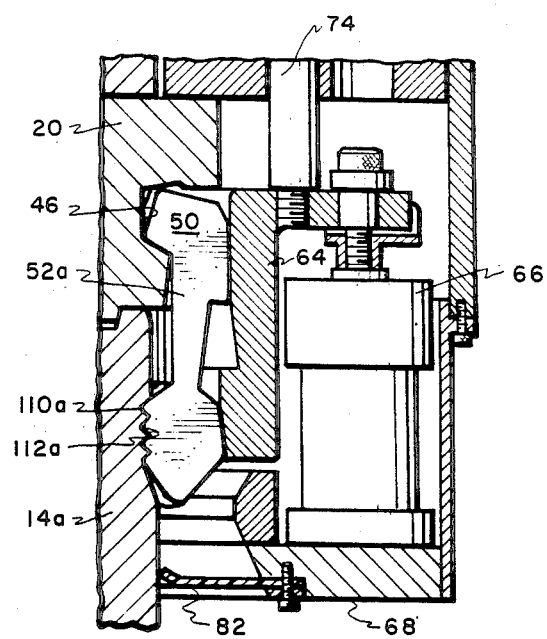
FIG. 4 is a partial view similar to FIGS. 2 and 3 but showing a different profile of the wellhead and the collet segments to mate with this profile.

While the foregoing was directed to collet segments with a lower portion 60 having a surface 110 which engages a wellhead with a flange or profile 112, FIG. 4 shows the same type of collet segments 52a with grooves 110a which are engageable with the type of wellhead 14a having complementary grooves 112a. Except for this latter modification of the collet segments to connect the connector 10 to the groove-type wellhead 14, the function of each of the connector parts is identical and thus were given the same reference number with the suffix a.

It should also be apparent that, while this connector 10 is disclosed as being connected to a wellhead, any tubular member having an appropriate profile may be connected to, or tied back to, other well units by such a connector.

We claim:

1. A collet-type connector for connecting one subsea well-type unit, such as a production tree, to another subsea well unit, such as a wellhead, the improvement comprising,
   an upper body member adapted to be connected to said one unit,
   a cam ring surrounding said upper body member, spaced therefrom and movable relative thereto.
   collet segments pivotally retained between said cam ring and said upper body member,
   camming surfaces on said cam ring,
   camming surfaces on said collet segments,
   said camming surfaces on said cam ring and camming surfaces on said collet segments forming two sets of camming surfaces which engage sequentially so that with the movement of said cam ring relative to said upper body member a first of said camming surface sets initially urges said collet segments to member and radially inwardly of said wellhead, and then the second camming surface set further said collet segments into clamping engagement with said wellhead and said upper body member to connect said collet-type connector to said wellhead, said sets of camming surfaces being characterized by having said first set to cease its urging function when said second set functions to thus reduce the power requirement for urging the collet segments into clamping engagement with said wellhead.

2. The connector as claimed in claim 1 further including a bumper ring having an inwardly angled shoulder and complementary shoulders on said collet segments wherein said ring and segment shoulders cooperate to hold said collet segments in an angled position against said upper body member to form a conical entry to facilitate entry of the wellhead into the connector.

3. The connector as claimed in claim 2 wherein the camming surfaces of said first set and said second set serve to hold the connector and wellhead in clamping engagement.

4. The connector as claimed in claim 3 wherein said collet segments cooperate to form a load path between the end of said collet segments and said upper body member and said bumper ring when said collet segments are disconnected from said wellhead.

5. The connector as claimed in claim 4 wherein said cam ring and collet segments are substantially overlapping, thus foreshortening the distance between both said units.

6. The connector as claimed in claim 5 wherein means are provided to move said cam ring relative to said upper body member.

7. The connector as claimed in claim 6 wherein said last mentioned means are hydraulic cylinders and wherein said hydraulic cylinders are removably attached to said cam ring so as to be removable for repair and/or replacement.

8. The connector as claimed in claim 7 wherein said collet segments are formed to engage a single groove profile in a wellhead.

9. The connector as claimed in claim 7 wherein said collet segments are formed to engage a multiple groove profile in a wellhead.

* * * * *